(12) United States Patent
Ma et al.

(10) Patent No.: US 8,334,687 B2
(45) Date of Patent: Dec. 18, 2012

(54) SYSTEMS AND METHODS FOR MEASURING ROTATIONAL SPEED AND POSITION OF A ROTATING DEVICE

(75) Inventors: Qi Ma, Farmington Hills, MI (US); Brian M. Tulkki, Howell, MI (US)

(73) Assignee: GM Global Technology Operations LLC

( * ) Notice: Subject to any disclaimer, the term of this patent is extended or adjusted under 35 U.S.C. 154(b) by 516 days.

(21) Appl. No.: 12/574,935

(22) Filed: Oct. 7, 2009

(65) Prior Publication Data

US 2010/0308799 A1    Dec. 9, 2010

Related U.S. Application Data

(60) Provisional application No. 61/185,336, filed on Jun. 9, 2009.

(51) Int. Cl.
*G01P 3/48* (2006.01)
(52) U.S. Cl. .......................... 324/166; 324/175
(58) Field of Classification Search .................... 324/166
See application file for complete search history.

(56) References Cited

U.S. PATENT DOCUMENTS

| | | | |
|---|---|---|---|
| 6,237,403 B1* | 5/2001 | Oldenettel et al. | 73/146.5 |
| 6,985,117 B2* | 1/2006 | Voigtlaender et al. | 343/711 |
| 7,782,183 B2* | 8/2010 | Wieser | 340/447 |
| 7,804,396 B2* | 9/2010 | Ross et al. | 340/443 |
| 2004/0246117 A1* | 12/2004 | Ogawa et al. | 340/445 |
| 2007/0277602 A1* | 12/2007 | Heise et al. | 73/146.5 |
| 2007/0295070 A1* | 12/2007 | Huang et al. | 73/146 |
| 2008/0272926 A1 | 11/2008 | Ma | |

FOREIGN PATENT DOCUMENTS

| | | |
|---|---|---|
| CN | 1708418 | 12/2005 |
| CN | 101072694 | 11/2007 |
| DE | 10317689 | 10/2004 |

\* cited by examiner

*Primary Examiner* — Thomas Valone

(57) ABSTRACT

A system includes a transceiver module and a rotating device. The transceiver module generates an electromagnetic (EM) field using an antenna. The rotating device includes N transponders arranged such that each of the N transponders passes through the EM field during one revolution of the rotating device. Each of the N transponders damps the EM field when passing through the EM field. The transceiver module determines a rotational speed of the rotating device based on a number of times the EM field is damped during a period. N is an integer greater than or equal to 1.

18 Claims, 7 Drawing Sheets

SYSTEMS AND METHODS FOR MEASURING ROTATIONAL SPEED AND POSITION OF A ROTATING DEVICE

CROSS-REFERENCE TO RELATED APPLICATIONS

This application claims the benefit of U.S. Provisional Application No. 61/185,336, filed on Jun. 9, 2009. The disclosure of the above application is incorporated herein by reference in its entirety.

FIELD

The present invention relates to determining a rotational speed and position of a rotating device, and more particularly to determining the rotational speed and position using radio-frequency identification technology.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle may include an engine speed sensor to monitor engine speed. The engine speed sensor generates an engine speed signal that indicates rotation of a crankshaft. An engine control module may determine the engine speed based on the engine speed signal.

For example, the engine speed sensor may include a Hall-effect sensor that detects passing of teeth on a gear connected to the crankshaft. The Hall-effect sensor may generate pulses that correspond to the passing of the teeth. The engine control module may determine the engine speed based on a number of pulses included in the engine speed signal during a period of time.

The teeth on the gear connected to the crankshaft may be arranged to yield a pattern of pulses when the gear is rotating. For example, a longer tooth may yield a longer pulse that indicates a position of the crankshaft. The engine control module may determine the position of the crankshaft based on the pattern of pulses detected (i.e., pattern recognition) when the gear is rotating.

SUMMARY

A system comprises a transceiver module and a rotating device. The transceiver module generates an electromagnetic (EM) field using an antenna. The rotating device includes N transponders arranged such that each of the N transponders passes through the EM field during one revolution of the rotating device. Each of the N transponders damps the EM field when passing through the EM field. The transceiver module determines a rotational speed of the rotating device based on a number of times the EM field is damped during a period. N is an integer greater than or equal to 1.

A method comprises generating an electromagnetic (EM) field using an antenna and determining a rotational speed of a rotating device based on a number of times the EM field is damped during a period. The rotating device includes N transponders arranged such that each of the N transponders passes through the EM field during one revolution of the rotating device. Each of the N transponders damps the EM field when passing through the EM field. N is an integer greater than or equal to 1.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
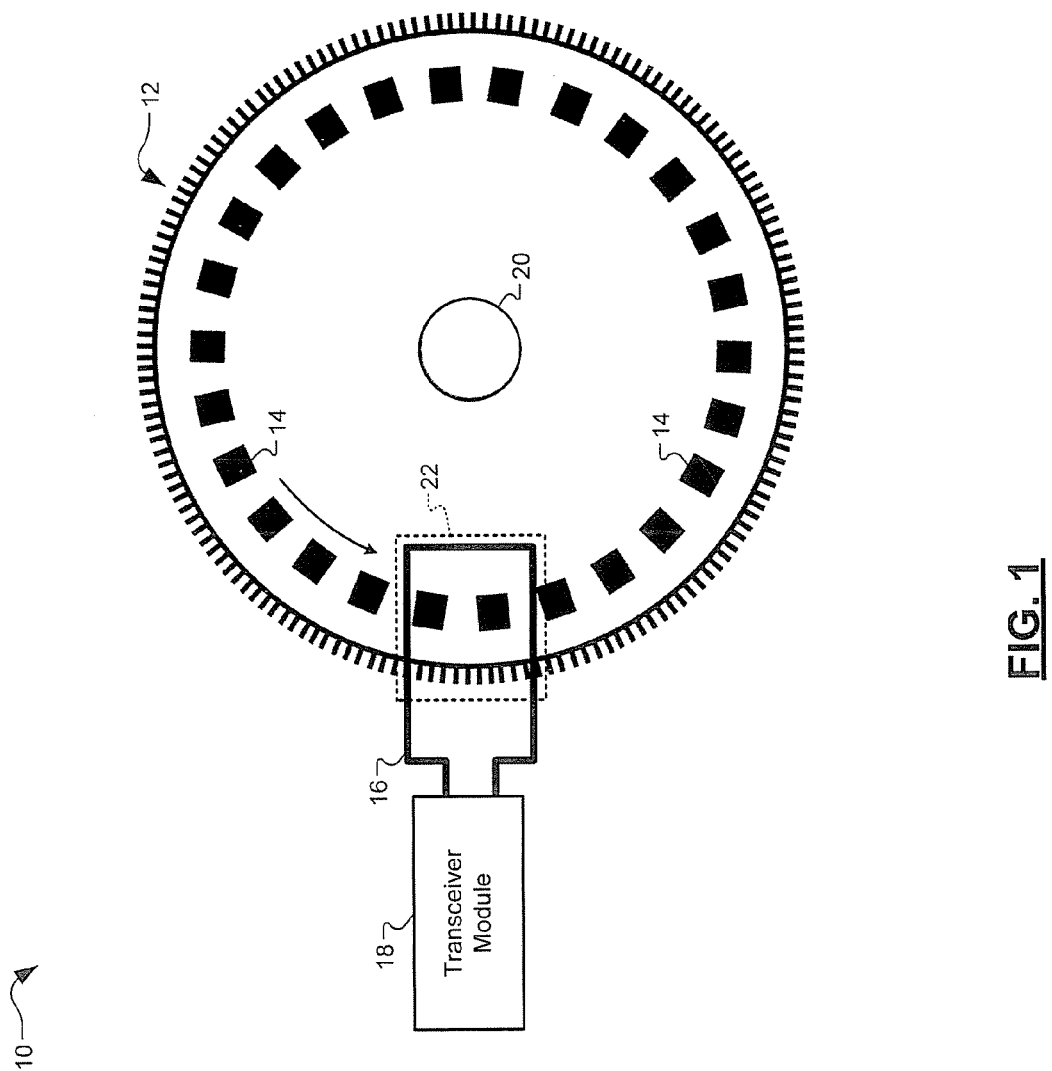
FIG. 1 is a functional block diagram of a radio-frequency identification (RFID) system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Typically, an engine control system determines a position of a rotating device (e.g., a crankshaft) using pattern recognition when the rotating device is rotating. A speed and position determination system of the present disclosure may determine the position of the rotating device when the rotating device is stationary. The speed and position determination system may include an antenna that reads data from one or more transponders arranged along the perimeter of the rotating device when the rotating device is stationary. Accordingly, the speed and position determination system may determine the position of the rotating device based on which of the transponders is read.

The transponders may damp a field transmitted by the antenna when the transponders move past the antenna.

Accordingly, the speed and position determination system may determine the rotational speed of the rotating device based on a number of times the transponders dampen the field transmitted by the antenna during a period.

Referring now to FIG. 1, a radio-frequency identification (RFID) system 10 includes a rotating device 12, transponders 14, an antenna 16, and a transceiver module 18. The rotating device 12 may rotate about an axle 20. The transponders 14 may be connected to the rotating device 12. For example, the transponders 14 may be arranged near a perimeter of the rotating device 12.

The RFID system 10 may be included in a vehicle system. Accordingly, the rotating device 12 may be a component of the vehicle system that rotates. For example only, the rotating device 12 may be one of a flywheel, a flex plate, a component connected to a camshaft, and an output shaft. While the RFID system 10 is described as being included in the vehicle system, the RFID system 10 may be used generally to measure the speed and position of rotating devices in other systems.

The transceiver module 18 may transmit signals (e.g., RF carrier signals) to the transponders 14 via the antenna 16. Each of the transponders 14 may include a transponder antenna (not shown) that receives the transmitted signals. The transmitted signals may hereinafter be referred to as a transmitted "field." The transponder antennas may absorb energy from the field transmitted by the antenna 16.

The transponders 14 may include memory that stores transponder data. For example, transponder data may include unique identification (ID) numbers. The transponders 14 may transmit the transponder data via the transponder antennas when the transponders 14 absorb a sufficient amount of energy from the field transmitted by the antenna 16. The transceiver module 18 may receive the transponder data via the antenna 16. Transponders that have received a sufficient amount of energy to transmit the transponder data may be referred to as "activated transponders." Transponders that have not received a sufficient amount of energy to transmit the transponder data may be referred to as "inactive transponders." In some implementations, the transponders 14 may be passive transponders. In other implementations, the transponders 14 may include a power source for transmitting the transponder data. The transponders 14 may operate at various frequencies (e.g., 125 kHz).

The antenna 16 may be positioned to receive the transponder data from each of the transponders 14 as the rotating device 12 rotates about the axle 20. For example, the transceiver module 18 may transmit/receive transponder data to/from the transponders 14 within a limited area 22, hereinafter referred to as a "detection area 22." The transceiver module 18 may receive transponder data from one or more transponders 14 at the same time when the one or more transponders 14 are within the detection area 22.

The speed and position determination system may determine a position of the rotating device 12 based on which transponders 14 are read in the detection area 22. For example, the speed and position determination system may determine the position of the rotating device 12 based on one or more unique IDs received from the transponders 14 in the detection area 22. The speed and position determination system may include a table that relates the position of the rotating device 12 to one or more unique ID numbers.

The transponders 14 may modify the field transmitted by the antenna 16 when the transponders 14 move through the detection area 22. The field transmitted by the antenna 16 may be damped when the transponders 14 move through the detection area 22. The transponders 14 may not absorb a sufficient amount of energy from the field transmitted by the antenna 16 to be activated when moving through the detection area 22. Accordingly, the transponders 14 may not transmit the transponder data when the rotating device 12 is rotating.

Figure 2:
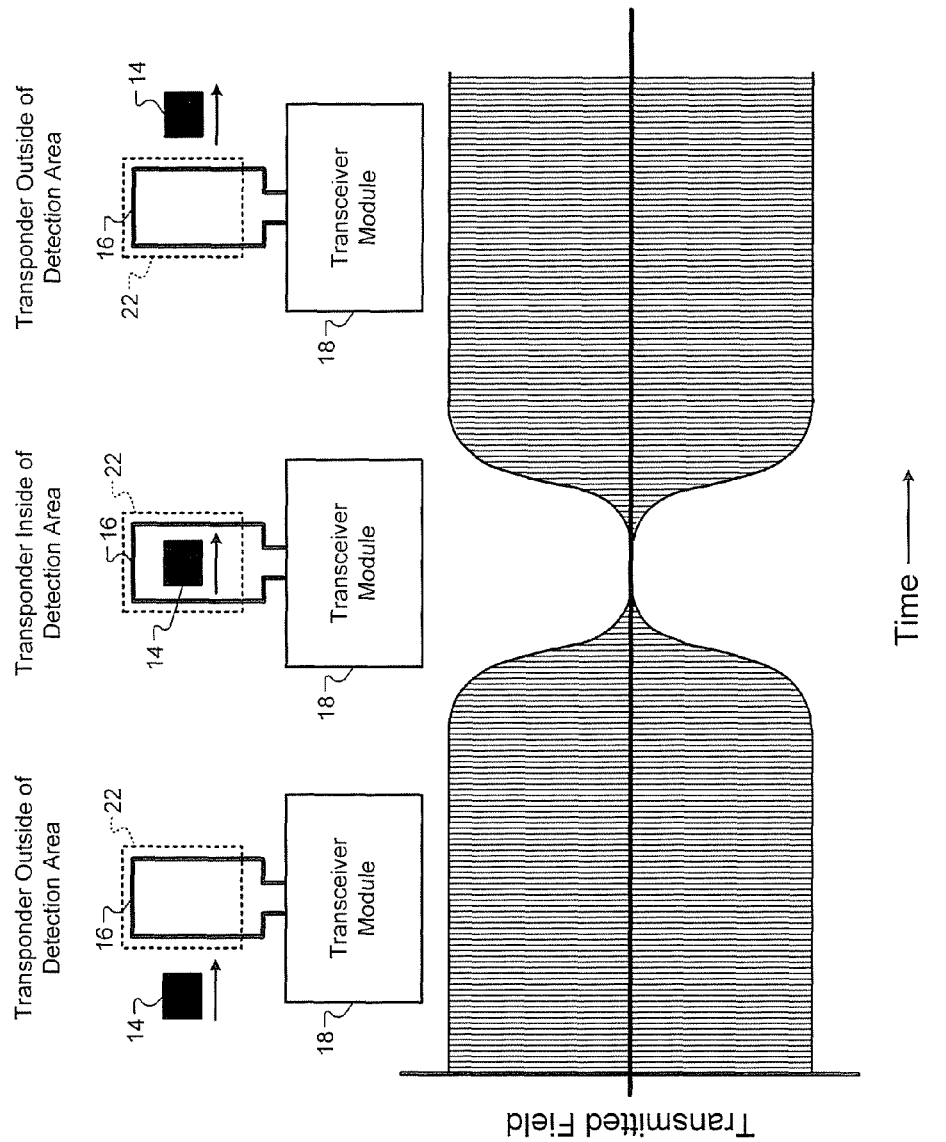
FIG. 2 illustrates modification of a transmitted field in the RFID system due to a location of a transponder according to the present disclosure.

Referring now to FIG. 2, the graph illustrates variations in the field transmitted by the antenna 16 based on a position of a transponder 14 relative to the antenna 16. The transceiver module 18 may detect when the transponder 14 damps the field transmitted by the antenna 16. For example, the transceiver module 18 may detect when the field is damped based on a voltage induced in the antenna 16.

Strength of the field may be at a maximum when the transponder 14 is outside of the detection area 22. The field may be damped to less than the maximum when the transponder 14 enters the detection area 22. Strength of the field may return to the maximum when the transponder 14 moves outside of the detection area 22. The speed and position determination system may determine a rotational speed of the rotating device 12 based on a number of times the field is damped during a period.

Figure 3:
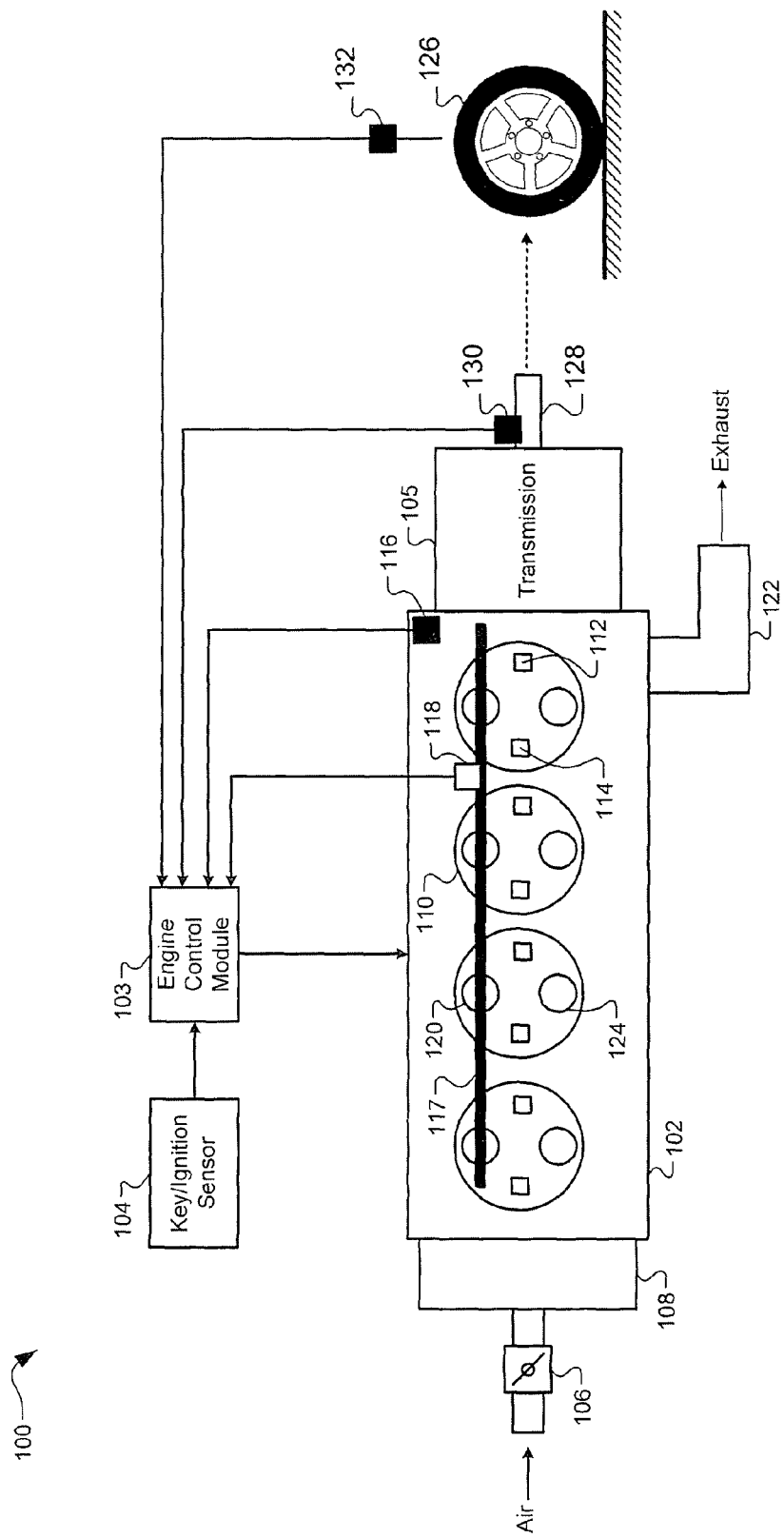
FIG. 3 is a functional block diagram of a vehicle system according to the present disclosure.

Referring now to FIG. 3, an exemplary vehicle system 100 includes an engine 102 that drives a transmission 105 via a crankshaft (not shown). While a spark ignition engine is illustrated, other engines are contemplated. For example only, compression ignition engines and homogenous charge compression ignition (HCCI) engines are also contemplated. An engine control module (ECM) 103 communicates with components of the vehicle system 100. The components may include the engine 102, sensors, and actuators. The ECM 103 may include the transceiver module 18. Accordingly, the ECM 103 may implement the speed and position determination system in the vehicle system 100.

The ECM 103 may communicate with a key/ignition sensor 104. The key/ignition sensor 104 may determine whether a key is inserted into the vehicle and/or whether the engine 102 has been started. The ECM 103 may actuate a throttle 106 to regulate airflow into an intake manifold 108. Air within the intake manifold 108 is distributed into cylinders 110. The ECM 103 actuates fuel injectors 112 to inject fuel into the cylinders 110. The ECM 103 may actuate spark plugs 114 to ignite an air/fuel mixture in the cylinders 110. Alternatively, the air/fuel mixture may be ignited by compression in a compression ignition engine. While four cylinders 110 of the engine 102 are shown, the engine 102 may include more or less than four cylinders 110.

The crankshaft rotates at engine speed or a rate that is proportional to the engine speed. A crankshaft sensor 116 generates a crankshaft signal that indicates rotation of the crankshaft. For example, the crankshaft signal may indicate rotation of a gear connected to the crankshaft. The crankshaft sensor 116 may include the antenna 16. The gear connected to the crankshaft may include the transponders 14. Accordingly, the ECM 103 may determine the rotational speed of the crankshaft and the position of the crankshaft when the crankshaft sensor 116 includes the antenna 16 and the gear connected to the crankshaft includes the transponders 14.

An intake camshaft 117 regulates a position of an intake valve 120 to enable air to enter the cylinder 110. Combustion exhaust within the cylinder 110 is forced out through an exhaust manifold 122 when an exhaust valve 124 is in an open position. An exhaust camshaft (not shown) regulates a position of the exhaust valve 124. Although single intake and exhaust valves 120, 124 are illustrated, the engine 102 may include multiple intake and exhaust valves 120, 124 per cylinder 110.

The intake camshaft 117 and the exhaust camshaft may rotate at engine speed or a rate that is proportional to the engine speed. A camshaft sensor 118 may generate a camshaft signal that indicates rotation of the intake camshaft 117 and/or the exhaust camshaft. For example, the camshaft signal may indicate rotation of a gear connected to the intake camshaft 117. The camshaft sensor 118 may include the antenna 16. The gear connected to the intake camshaft 117 may include the transponders 14. Accordingly, the ECM 103 may determine the rotational speed of the intake camshaft 117 and the position of the intake camshaft 117 when the camshaft sensor 118 includes the antenna 16 and the gear connected to the intake camshaft 117 includes the transponders 14.

Drive torque produced by the engine 102 may drive wheels 126 via an output shaft 128. A vehicle speed sensor 130 may generate a vehicle speed signal that indicates rotation of the output shaft 128. The vehicle speed sensor 130 may include the antenna 16. The output shaft 128 may include the transponders 14. Accordingly, the ECM 103 may determine the rotational speed of the output shaft 128 and the position of the output shaft 128 when the vehicle speed sensor 130 includes the antenna 16 and the output shaft 128 includes the transponders 14. The ECM 103 may determine a speed of the vehicle based on the vehicle speed signal.

The vehicle system 100 may include one or more wheel speed sensors 132 that generate wheel speed signals. The wheel speed signals may indicate rotation of components connected to the wheels 126. The wheel speed sensors 132 may each include the antenna 16. The components connected to the wheels 126 may include the transponders 14. Accordingly, the ECM 103 may determine the position of the wheels 126 and the rotational speed of the wheels 126 when the wheel speed sensors 132 include the antenna 16 and the components connected to the wheels 126 include the transponders 14. The ECM 103 may determine the speed of the vehicle based on the wheel speed signals.

Figure 4:
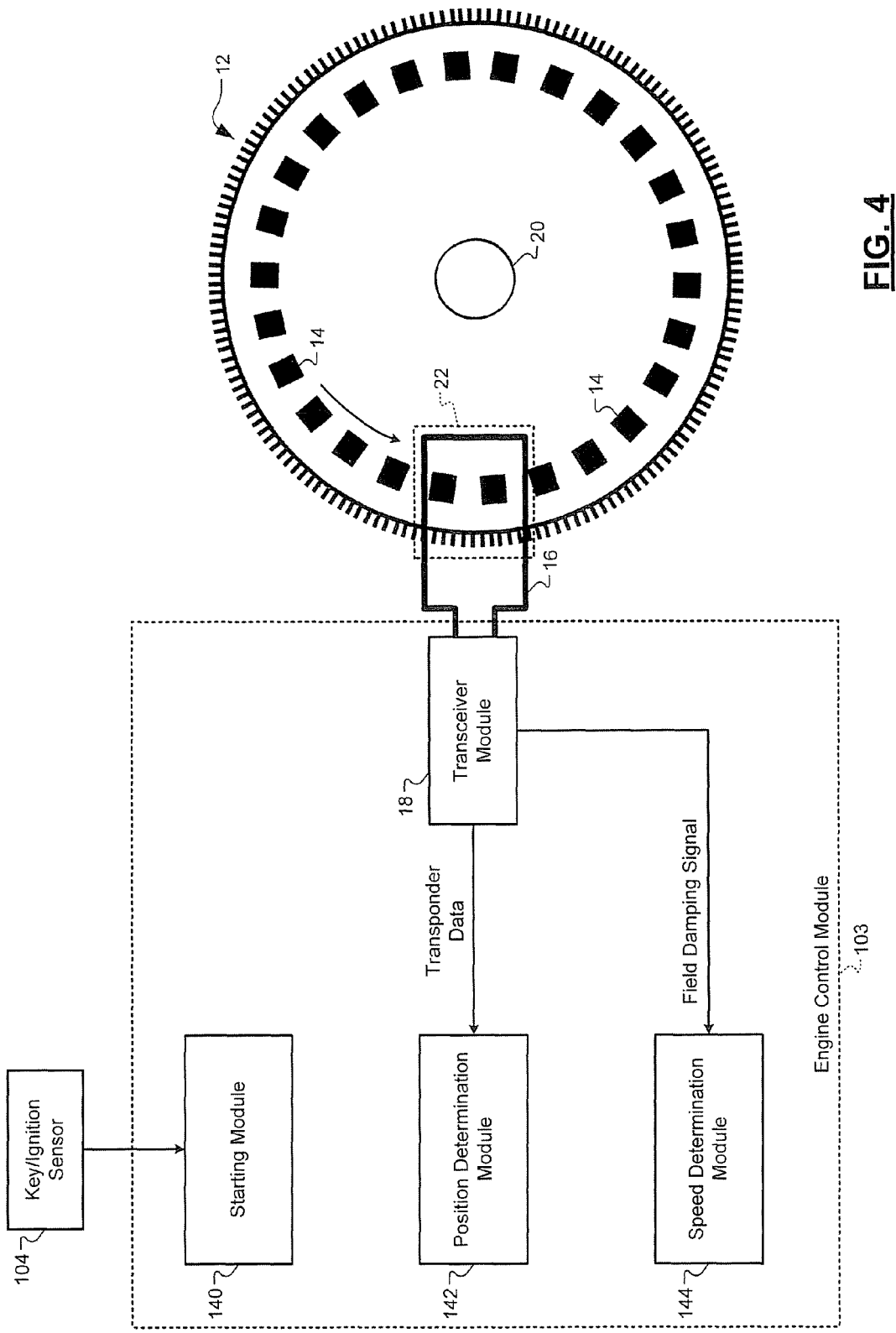
FIG. 4 is a functional block diagram of the RFID system integrated with an engine control module according to the present disclosure.

Referring now to FIG. 4, the ECM 103 may include the transceiver module 18, a starting module 140, a position determination module 142, and a speed determination module 144. The transceiver module 18 may transmit/receive signals to/from the transponders 14 via the antenna 16. The starting module 140 may determine when the engine 102 starts. The position determination module 142 may determine the position of the rotating device 12. The speed determination module 144 may determine the rotational speed of the rotating device 12.

The rotating device 12 may include a component of the vehicle system 100 that rotates. For example, the rotating device 12 may include at least one of the gear connected to the crankshaft, the gear connected to the intake camshaft 117, the output shaft 128, and the components connected to the wheels 126. While the speed and position determination system is described in the vehicle system 100, the speed and position determination system may be generally applicable to systems that measure rotational speed of rotating devices.

The speed and position determination system may be implemented when the engine 102 is turned on. The starting module 140 may determine that the engine 102 is turned on based on signals received from the key/ignition sensor 104. The rotating device 12 may be stationary when the engine 102 is started. Accordingly, the position determination module 142 may determine an initial position of the rotating device 12 when the engine 102 is started. The position determination module 142 may determine the initial position of the rotating device 12 based on which transponders 14 are read when the engine 102 is started. For example, the position determination module 142 may determine the position of the rotating device 12 based on one or more unique IDs received from the transponders 14 in the detection area 22 when the engine 102 is started.

The position determination module 142 may include calibration memory that relates positions of the rotating device 12 to unique ID numbers stored in each of the transponders 14. For example, if 10 transponders 14 are equally spaced along the perimeter of the rotating device 12, each of the 10 transponders 14 may correspond to a 36 degree slice of the rotating device 12. Accordingly, the position determination module 142 may determine which 36 degree slice is in the detection area 22 based on the unique ID of the transponder 14 in the detection area 22.

The detection area 22 may include more than one transponder 14 when the engine 102 is started. The position determination module 142 may determine the position of the rotating device 12 based on more than one unique ID number when more than one transponder 14 is in the detection area 22 when the engine 102 is started. The position determination module 142 may determine the initial position of the rotating device 12 with greater resolution when the detection area 22 includes more than one transponder 14. For example, when the detection area 22 includes two transponders 14, the position determination module 142 may determine that the position of the rotating device 12 is between the two positions corresponding to the two transponders 14. The position determination module 142 may determine the position of the rotating device 12 based on one or more unique IDs using averaging algorithms and/or fuzzy logic.

In some implementations, the transponders 14 may be arranged along the perimeter of the rotating device 12 so that at least one transponder is in the detection area 22 at all times. Accordingly, the position determination module 142 may determine the position of the rotating device 12 at any angle of rotation. In other implementations, the transponders 14 may be arranged along the perimeter of the rotating device 12 so that more than one transponder 14 is in the detection area at all times.

While the position determination module 142 is described as determining the position of the rotating device 12 when the engine 102 is started, the position determination module 142 may also determine the position of the rotating device 12 when the engine 102 is stopped or stalled. The position determination module 142 may store the position of the rotating device 12 when the engine 102 is off. The ECM 103 may retrieve the stored position when the engine 102 is started.

The speed determination module 144 may determine the rotational speed of the rotating device 12 based on a number of times the field transmitted by the antenna 16 is damped during a period. For example only, the speed determination module 144 may detect the field damped 10 times per revolution of the rotating device 12 when the rotating device 12 includes 10 transponders 14.

In some implementations, the transceiver module 18 may change the strength of the field transmitted from the antenna 16. The transceiver module 18 may transmit a stronger field to activate the transponders 14 and read the transponder data from the activated transponders. Accordingly, the transceiver module 18 may transmit the stronger field to determine the position of the rotating device 12 when the engine 102 is started. Activated transponders may react differently to the field transmitted by the antenna 16 than inactive transponders. For example, activated transponders may transmit transponder data when the rotating device 12 is rotating, instead of damping the field. The activated transponders may not transmit transponder data when moving through a weaker field, however the activated transponders may still damp the weaker field. Accordingly, the transceiver module 18 may transmit a weaker field when the rotating device 12 is rotating, so the activated transponders behave similarly to the inactive transponders when the rotating device 12 is rotating.

In some implementations, the transceiver module 18 may apply the same magnetic field strength when the rotating device 12 is stationary and when the rotating device 12 is rotating. To prevent the activated transponders from transmitting transponder data when moving through the field, the transceiver module 18 may send a command to the activated transponders to deactivate the activated transponders. For example only, the activated transponders may be inactive transponders after the transceiver module 18 sends the command to deactivate the activated transponders. Accordingly, the activated transponders that receive the command to deactivate will behave similarly to the transponders that were not activated when the engine 102 was started. In other words, the activated transponders that were deactivated may not transmit transponder data, but may damp the field.

In some implementations, the speed and position determination system may implement pattern recognition to determine the position of the rotating device 12 while the rotating device 12 is rotating. The transponders 14 may be selectively arranged on the rotating device 12 to implement pattern recognition. For example, the transponders 14 may be arranged so that a gap between two of the transponders 14 is larger than a gap between each of the other transponders 14. Accordingly, the ECM 103 may determine the position of the rotating device 12 while the rotating device 12 is rotating based on a longer time lapse that occurs between the transponders 14 that are separated by the larger gap.

Figure 5:
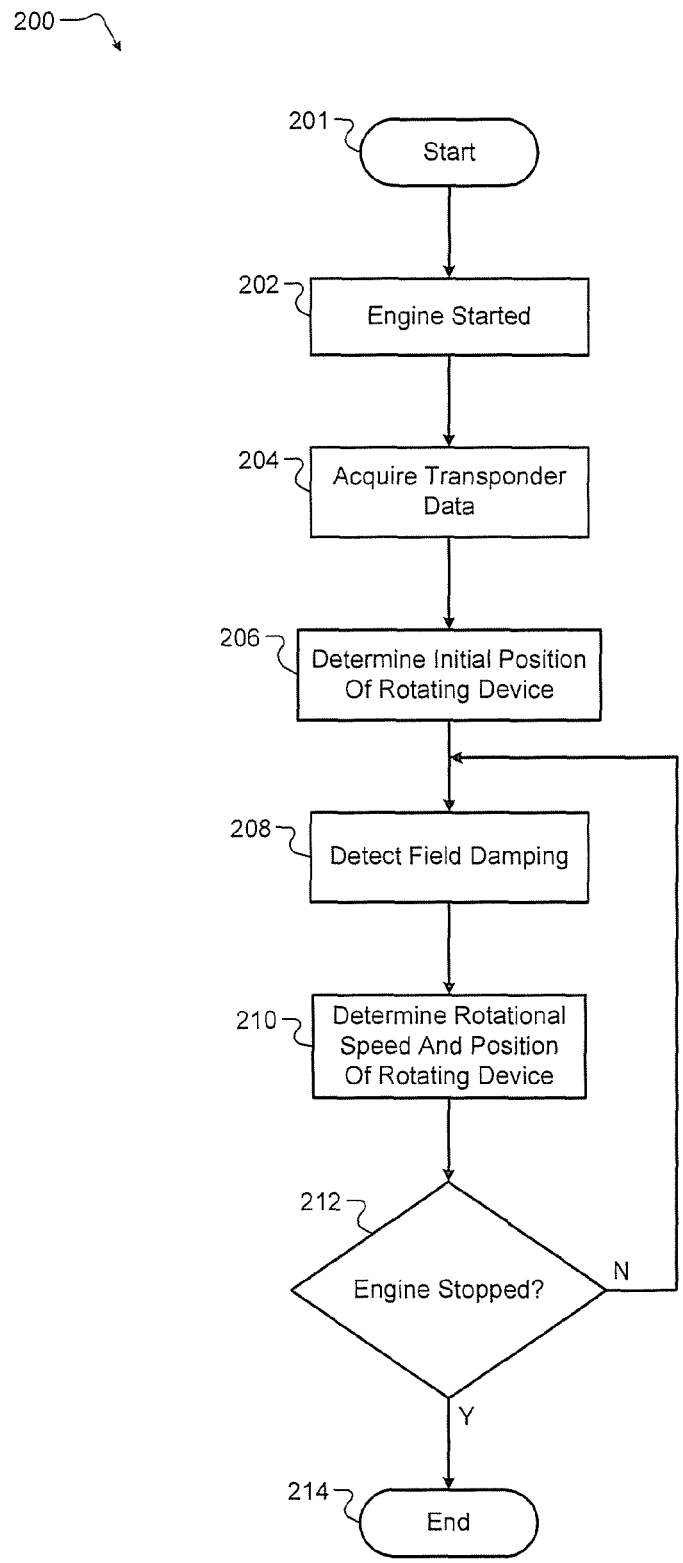
FIG. 5 illustrates a method for determining a rotational speed and position of a rotating device according to the present disclosure.

Referring now to FIG. 5, a method 200 for determining a rotational speed and position of a rotating device starts in step 201. In step 202, the starting module 140 determines that the engine 102 is started. In step 204, the position determination module 142 acquires transponder data. In step 206, the position determination module 142 determines the initial position of the rotating device 12.

In step 208, the speed determination module 144 detects field damping when the rotating device 12 is rotating. In step 210, the speed determination module 144 determines the rotational speed and position of the rotating device 12. In step 212, the ECM 103 determines whether the engine 102 has stopped. If the result of step 212 is false, the method 200 continues with step 208. If the result of step 212 is true, the method 200 continues with step 214. The method 200 ends in step 214.

Figure 6:
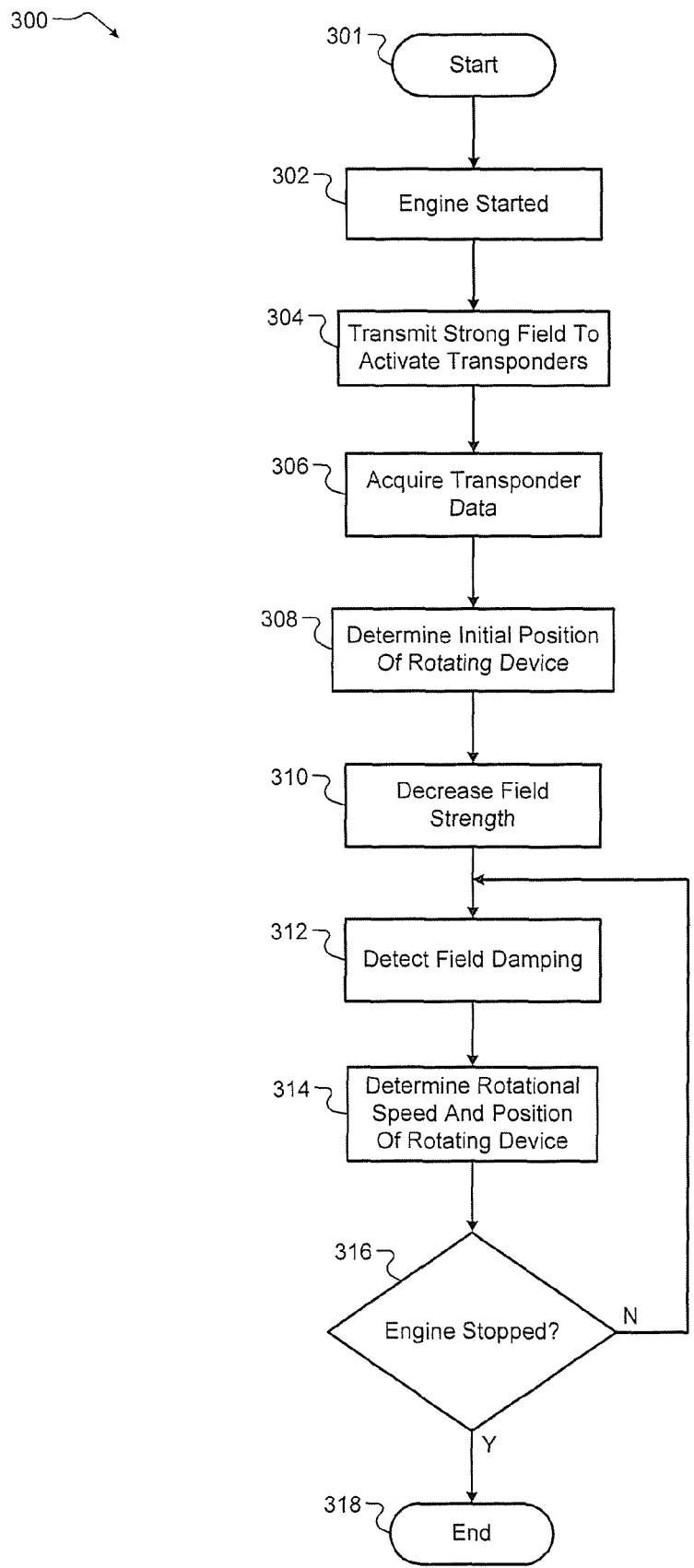
FIG. 6 illustrates a method for determining a rotational speed and position of the rotating device using varying field strengths according to the present disclosure.

Referring now to FIG. 6, a method 300 for determining a rotational speed and position of a rotating device using varying field strengths starts in step 301. In step 302, the starting module 140 determines that the engine 102 is started. In step 304, transceiver module 18 transmits a strong field to activate the transponders 14 in the detection area 22. In step 306, the position determination module 142 acquires transponder data. In step 308, the position determination module 142 determines the initial position of the rotating device 12. In step 310, the transceiver module 18 decreases the strength of the field when the rotating device 12 starts rotating.

In step 312, the speed determination module 144 detects field damping when the rotating device 12 is rotating. In step 314, the speed determination module 144 determines the rotational speed and position of the rotating device 12. In step 316, the ECM 103 determines whether the engine 102 has stopped. If the result of step 316 is false, the method 300 continues with step 312. If the result of step 316 is true, the method 300 continues with step 318. The method 300 ends in step 318.

Figure 7:
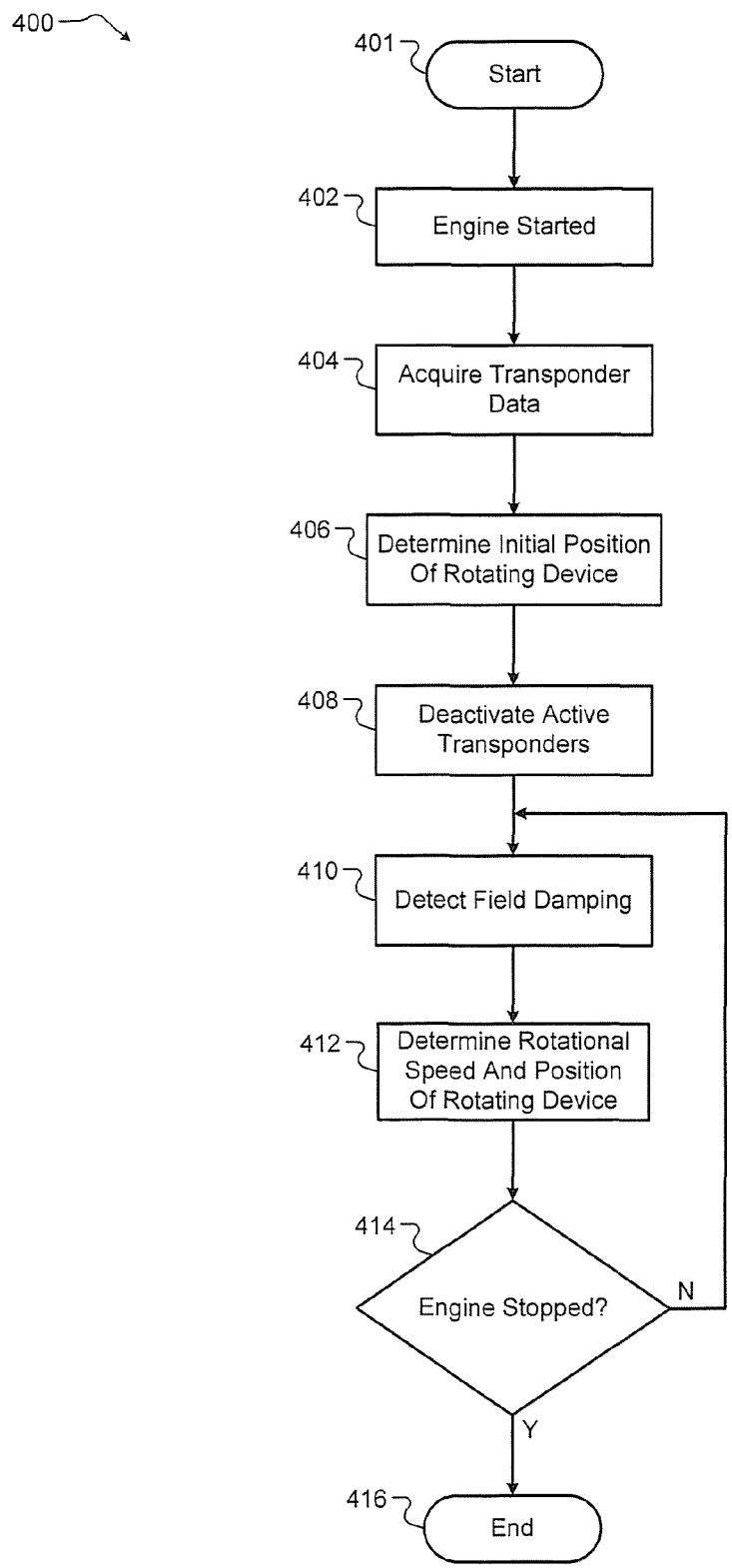
FIG. 7 illustrates a method for determining a rotational speed and position of the rotating device that includes deactivating a transponder according to the present disclosure.

Referring now to FIG. 7, a method 400 for determining a rotational speed and position of a rotating device that includes deactivating a transponder starts in step 401. In step 402, the starting module 140 determines that the engine 102 is started. In step 404, the position determination module 142 acquires transponder data. In step 406, the position determination module 142 determines the initial position of the rotating device 12.

In step 408, the transceiver module 18 deactivates the activated transponders. In step 410, the speed determination module 144 detects field damping when the rotating device 12 is rotating. In step 412, the speed determination module 144 determines the rotational speed and position of the rotating device 12. In step 414, the ECM 103 determines whether the engine 102 has stopped. If the result of step 414 is false, the method 400 continues with step 410. If the result of step 414 is true, the method 400 continues with step 416. The method 400 ends in step 416.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
   a transceiver module that generates an electromagnetic (EM) field using an antenna; and
   a rotating device that includes N transponders arranged such that each of the N transponders passes through the EM field during one revolution of the rotating device,
   wherein each of the N transponders damps the EM field when passing through the EM field, wherein the transceiver module determines a rotational speed of the rotating device based on a number of times the EM field is damped during a period, and wherein N is an integer greater than or equal to 1.

2. The system of claim 1 wherein the transceiver module determines a position of the rotating device based on data transmitted from one or more of the N transponders in the EM field.

3. The system of claim 2 wherein the transceiver module determines when the rotating device is stationary and determines the position of the rotating device when the rotating device is stationary.

4. The system of claim 3 wherein the transceiver module commands the one or more of the N transponders in the EM field to stop transmitting the data after the transceiver module receives the data, wherein the one or more of the N transponders does not transmit the data when passing through the EM field after receiving the command.

5. The system of claim 1 wherein the rotating device is included in a vehicle, and wherein the rotating device is connected to at least one of a crankshaft, a camshaft, an output shaft of a transmission, and a wheel.

6. The system of claim 1 wherein each of the N transponders includes an antenna and memory.

7. The system of claim 2 wherein the transceiver module determines the position of the rotating device based on a table that relates the data transmitted from the one or more of the N transponders to the position of the rotating device.

8. The system of claim 1 wherein the transponders are arranged to produce a pattern of damping when the rotating device is rotating, and wherein the transceiver module determines a position of the rotating device when the rotating device is rotating based on the pattern of damping.

9. The system of claim 2 wherein the transceiver module generates the EM field at a first strength when the rotating device is stationary, wherein the N transponders transmit data when the transponders are in the EM field having the first strength, wherein the transceiver module generates the EM field at a second strength when the rotating device is rotating, and wherein the N transponders do not transmit data when the transponders are in the EM field having the second strength.

10. A method comprising:
generating an electromagnetic (EM) field using an antenna; and
determining a rotational speed of a rotating device based on a number of times the EM field is damped during a period,
wherein the rotating device includes N transponders arranged such that each of the N transponders passes through the EM field during one revolution of the rotating device, wherein each of the N transponders damps the EM field when passing through the EM field, and wherein N is an integer greater than or equal to 1.

11. The method of claim 10 further comprising determining a position of the rotating device based on data transmitted from one or more of the N transponders in the EM field.

12. The method of claim 11 further comprising:
determining when the rotating device is stationary; and
determining the position of the rotating device when the rotating device is stationary.

13. The method of claim 12 further comprising commanding the one or more of the N transponders in the EM field to stop transmitting the data after receiving the data, wherein the one or more of the N transponders does not transmit the data when passing through the EM field after receiving the command.

14. The method of claim 10 wherein the rotating device is included in a vehicle, and wherein the rotating device is connected to at least one of a crankshaft, a camshaft, an output shaft of a transmission, and a wheel.

15. The method of claim 10 wherein each of the N transponders includes an antenna and memory.

16. The method of claim 11 further comprising determining the position of the rotating device based on a table that relates the data transmitted from the one or more of the N transponders to the position of the rotating device.

17. The method of claim 10 further comprising determining a position of the rotating device when the rotating device is rotating based on a pattern of damping, wherein the transponders are arranged to produce the pattern of damping when the rotating device is rotating.

18. The method of claim 11 further comprising:
generating the EM field at a first strength when the rotating device is stationary, wherein the N transponders transmit data when the transponders are in the EM field having the first strength; and
generating the EM field at a second strength when the rotating device is rotating, wherein the N transponders do not transmit data when the transponders are in the EM field having the second strength.

* * * * *